Aug. 4, 1931.   L. R. SHAFFER   1,817,588
HEN'S NEST
Filed March 11, 1930   2 Sheets-Sheet 2
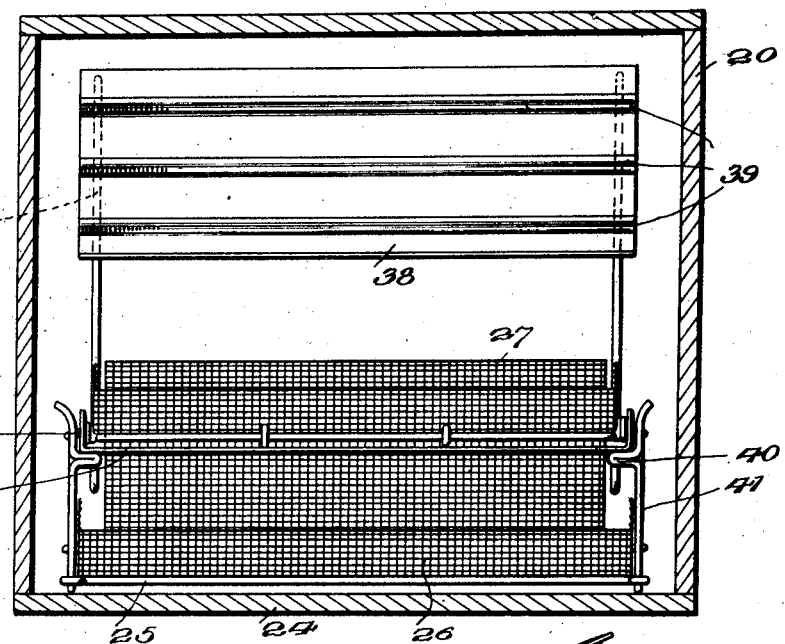
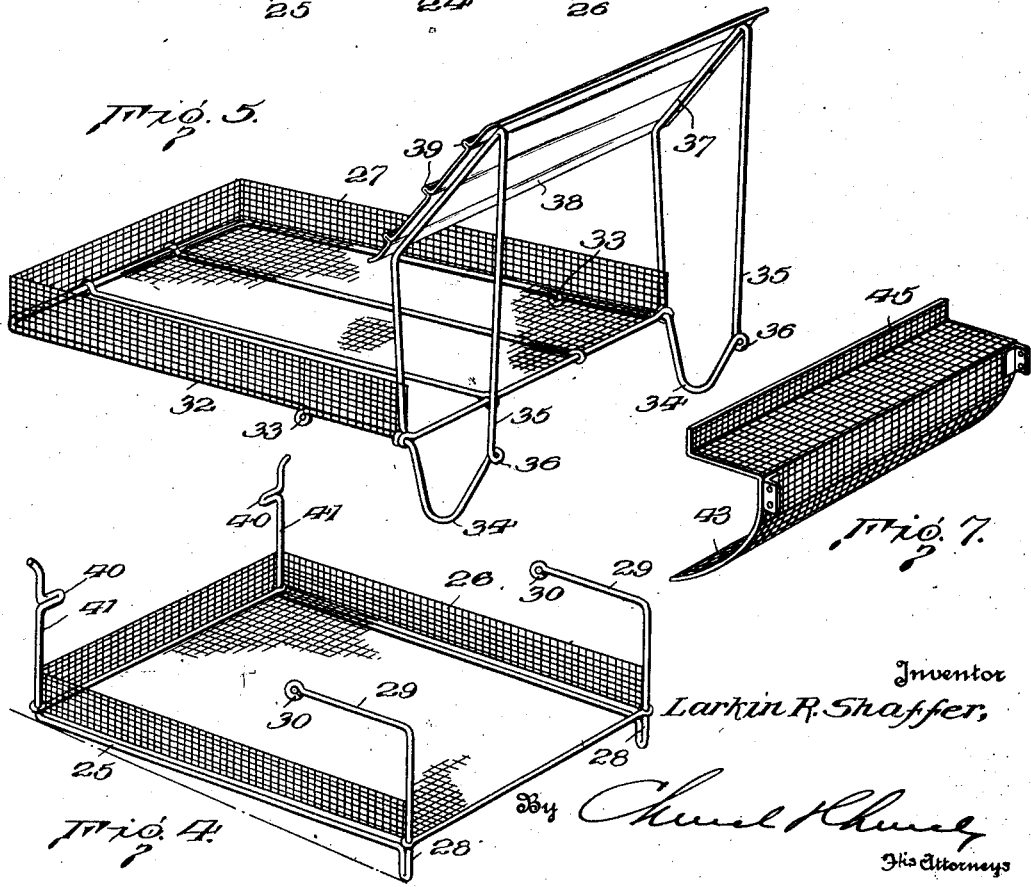
Inventor
Larkin R. Shaffer,
By
His Attorneys Patented Aug. 4, 1931

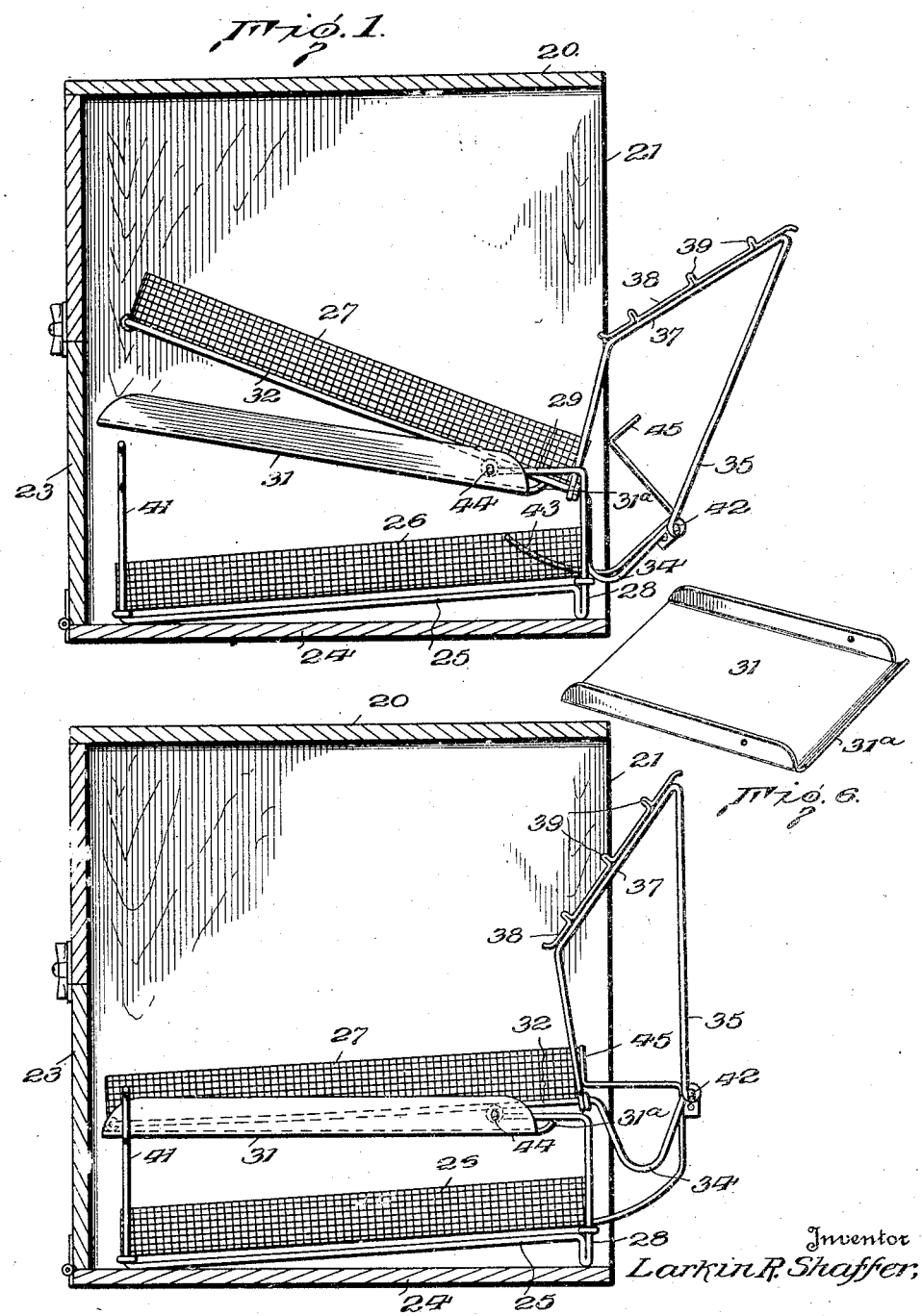

1,817,588

UNITED STATES PATENT OFFICE

LARKIN R. SHAFFER, OF GARLAND, UTAH

HEN'S NEST

Application filed March 11, 1930. Serial No. 434,886.

This invention relates to improvements in hen's nests.

One object of the invention is to provide a nest structure wherein an egg will be automatically removed from the nest when the hen which laid it leaves the nest, the eggs thus removed being deposited in a tray beneath the nest.

Another object is the provision of a nest that can be maintained with a maximum degree of cleanliness, no dirt whatever reaching the tray in which the eggs are deposited. In this connection, an arrangement is also provided that facilities the removal of dirt or foreign matter from the nest.

A further object consists in the use of means for transferring the eggs from the nest to the tray wherein each egg temporarily remains visible at the entrance of the nest, serving as a nest egg to attract the attention of the next succeeding hen entering the nest. As this next hen enters the compartment containing the nest, the egg laid by the preceding hen is transferred to the tray.

A still further object is to provide a nest of simple and comparatively inexpensive construction, which can be inserted or installed in nest compartments now commonly found in general use.

With these and other objects in view, the invention consists in certain novel details of construction and combinations and arrangements of parts, all as will be hereinafter more fully described, and the novel features thereof particularly pointed out in the appended claims.

In the accompanying drawings:

Figure 1 is a side view of a nest embodying the present improvements, the compartment in which the nest is installed being shown in section and the nest being shown in what will be called its open position;

Fig. 2 is a similar view, but showing the nest closed;

Fig. 3 is a front view of the structure as illustrated in Fig. 2;

Fig. 4 is a perspective view of the tray and its supporting frame;

Fig. 5 is a similar view of the nest and its supporting frame;

Fig. 6 is a like view of the protective plate used between the nest and tray; and Fig. 7 is a perspective view of the trough for directing the eggs from the nest to the tray.

In accordance with the present invention, the structure constituting the nest is adapted to be inserted or installed in a compartment such as is now found in the usual hen houses through the country, these compartments being arranged in any suitable fashion in the house, as, for instance, in tiers. In the accompanying drawings, one of the compartments is indicated at 20, the front 21 of the compartment being open and the rear of the compartment being closed, although access may be had to the interior of the compartment through an opening adapted to be closed by the hinged door 23. Attached to the floor 24 of the compartment by any suitable fastening means, is a frame 25, on which is supported a tray 26, the tray being inclined somewhat with its lower end at the rear of the compartment. This tray, which is preferably made of wire mesh material, is adapted to have deposited therein eggs that might be laid by the hens in the nest 27 proper, which is adapted to be positioned above the tray. At the front of the compartment frame 25 is formed with upright portions 28, whose upper ends 29 are offset rearwardly, these portions 29 terminating in eyes 30. Pivoted in the eyes 30 is an imperforate plate 31, of a width corresponding to the tray 26 and nest 27.

The nest 27, which is also of wire mesh material, is carried on a frame 32, also provided with eyes 33 through which the rod 44 for mounting plate 31 in eyes 30 extends, so that the plate 31 and the nest 27 are pivoted on a common center. At its forward portion the side members of frame 32 are offset downwardly as at 34, and then upwardly at a point outside of the compartment 20. This upwardly extending portion, indicated at 35, also has eyes 36 formed therein and at the upper ends of the upwardly extending portions 35, the material of the frame is bent downwardly so that its ends may be attached to the side members of frame 32. A portion of this downwardly extending portion of the nest frame, indicated at 37, has a plate 38 mounted thereon, forming a platform on which hens entering the compartment might walk, this plate being provided with ribs 39 to prevent the feet of the hens from slipping.

The major portion of the combined weight of frame 32 and nest 27 is at the forward portion of the compartment, so that in the absence of a hen, the frame 32 will tilt forwardly, as shown in Figure 1, and by reason of the bottom of the frame engaging the upwardly offset front end 31a of plate 31, said plate will also be tilted forwardly somewhat. However, upon a hen entering the nest, the nest 27 will be depressed, together with plate 31, until the nest assumes a substantially horizontal position, as shown in Fig. 2, the downward movement of the rear end of the plate 31 and nest 27 being limited by projections 40, formed on the upwardly extending portions 41 at the rear of frame 25.

Mounted in the eyes 36 on the forward upwardly extending portions 35 of the nest frame is a rod 42, and mounted on said rod is an element which may be termed a trough or cradle. This so-called trough, which is preferably also formed of a wire mesh material, is indicated at 43. It consists of a lower portion extending downwardly from rod 42 and rearwardly into the compartment, and a horizontal portion above rod 42, this horizontal portion projecting rearwardly toward the compartment and at its free end being formed with a flange 45. The trough traverses the full width of the nest 27 and tray 26, and when the nest is in its horizontal position, the flange 45 constitutes the front end wall of the nest, as shown in Fig. 2. In the absence of a hen on the nest, the rocking movement of frame 32 on its pivotal center causes the trough to assume the position shown in Figure 1. In this position, the flange 45 of the trough is spaced from the nest 27 so that the forward end of the nest is open and the downwardly extending curved portion of the trough projects under the nest with the inner edge of the curved portion somewhat above the center of the curved portion of the trough.

With this construction, and assuming the parts to be in their normal position, as shown in Figure 1, upon a hen entering the nest, the parts will assume the position shown in Fig. 2. After the hen has laid the egg, and leaves the nest, the parts return to the position shown in Figure 1, under which circumstances the egg will roll forwardly in the nest 27, into the curved portion of trough 43. It will remain in this trough, visible to the next succeeding hen entering the nest, in this way serving as a nest egg. When the next hen enters the nest, the several parts are again moved to the positions shown in Fig. 2, whereupon the egg formerly held in trough 43 will roll into the tray 26. As this next succeeding hen leaves the nest, the parts will again function as just described. In this way, there is always an egg in the forward portion of the compartment, or rather in the trough, to attract the attention of a hen entering the nest. By having each egg removed from the nest immediately upon the hen which laid it leaving the nest, there is no possibility of the egg becoming soiled, or broken, and what is just as important, eggs laid by preceding hens can not be affected by subsequent hens sitting.

By constructing the tray 26 and nest 27 of wire mesh material, there is a free circulation of air through both of these members, and, at the same time, there is no possibility of dirt accumulating therein. This is of considerable importance, especially insofar as the nest 27 is concerned. In addition, by having the plate 31, which is imperforate, interposed between the perforate bottom of nest 27 and the tray 26, all dirt that would otherwise fall from the nest into the tray is accumulated on the plate 31. It is for this reason that the pivotal connections of plate 31 and nest 27 are so arranged as to move the nest 27 relatively to the plate 31, or, in other words, the nest 27 is elevated more than plate 31, so as to provide a space between the same, whereby the plate may be cleaned, access being had to the interior of the compartment 30 for this purpose through the rear door 23.

What I claim is:

1. In a hen's nest, the combination of a compartment open at the front, a tray supported on the bottom of said compartment, a nest having a perforate bottom, said nest being tiltable on a horizontal axis above said tray to discharge eggs therefrom into said tray, and an imperforate plate interposed between the bottom of the nest and said tray.

2. In a hen's nest, the combination of a tray adapted to rest upon the floor of a nest compartment, a nest pivotally supported above said tray, whereby one end of the nest will tilt toward one end in the absence of a hen, said nest end being open, whereby an egg will roll from said open end when the nest is tilted, and a trough positioned below said open end adapted to receive an egg discharged from the nest and deposit it in said tray.

3. In a hen's nest, the combination of a tray adapted to be positioned on the floor of a nest compartment, a nest having an open end, said nest being pivotally supported above said tray and adapted to assume a substantially horizontal position when a hen is on the same and adapted to tilt toward said open end in the absence of a hen, whereby an egg in the nest will be discharged through said open end in the absence of a hen, means below said open end of the nest to receive an egg discharged therefrom and deposit it in said tray, and means removably positioned across the open end of the nest when the latter is in horizontal position.

4. In a hen's nest, the combination of a tray adapted to be positioned on the floor of a nest compartment, a nest having an open end, said nest being pivotally supported above said tray and adapted to assume a substantially horizontal position when a hen is on the same and adapted to tilt toward said open end in the absence of a hen, whereby an egg in the nest will be discharged through said open end in the absence of a hen, and a trough extending transversely of the nest below the open end thereof adapted to receive an egg discharged from the nest, said trough being pivotally mounted to tilt and deposit eggs in the tray when the nest assumes horizontal position.

5. In a hen's nest, the combination of a tray adapted to be positioned on the floor of a nest compartment, a nest having an open end, said nest being pivotally supported above said tray and adapted to assume a substantially horizontal position when a hen is on the same and adapted to tilt toward said open end in the absence of a hen, whereby an egg in the nest will be discharged through said open end in the absence of a hen, a pivoted trough extending transversely of and below the open end of the nest and adapted to receive eggs discharged from the nest and deposit them in said tray, and a flange on said trough adapted to close the open end of the nest when the latter assumes its horizontal position.

6. In a hen's nest, the combination of a tray adapted to be supported on the floor of a nest compartment, a perforate nest above said tray, and an imperforate plate interposed between the bottom of the nest and said tray, said nest being pivotally supported and adapted to assume a substantially horizontal portion when a hen is on the same, and adapted to tilt upon the departure of the hen whereby an egg laid in the nest will roll to the low side thereof and be discharged over the low edge of the nest into the tray.

7. In a hen's nest, the combination of a frame adapted to be positioned on the floor of a nest compartment, a tray supported on said frame, a nest pivoted on said frame whereby said nest may be tilted endwise with respect to the tray, means on said frame for limiting downward movement of one end of the nest, and a normally open closure for one end of said compartment pivoted on said frame and movable by said nest to close said end of the compartment when a hen enters the nest.

8. In a hen's nest, the combination of a frame adapted to be mounted on the floor of a nest compartment, having an entrance at one end, a second frame pivotally supported on the first frame, a tray mounted on the first frame, a nest carried by said pivoted frame, and a closure for the compartment entrance carried by said pivoted frame.

9. In a hen's nest, the combination of a frame adapted to be mounted on the floor of a nest compartment, a tray carried on said frame, a second frame pivoted on the first frame, a nest carried by the pivoted frame, said nest having a perforate bottom adapted to assume a substantially horizontal position when a hen is on the same and adapted to tilt upon the departure of the hen whereby an egg laid in the nest will roll to and over the low edge thereof and be deposited in said tray, and an imperforate plate interposed between the bottom of the nest and said tray.

10. In a hen's nest, the combination of a frame adapted to be positioned on the floor of a nest compartment, said compartment having an entrance thereto, a tray on said frame, an imperforate plate carried by said frame above said tray, a nest pivotally supported by said frame above said plate, said nest having a perforate bottom, and a closure for the compartment entrance moved into and out of closed position by said nest.

11. In a hen's nest, the combination of a frame adapted to be positioned in the floor of a nest compartment, said compartment having an entrance thereto, a tray on said frame, an imperforate plate carried by said frame above the tray, a second frame pivotally supported on the first frame, a nest having a perforate bottom supported on the pivoted frame above said plate, and means carried by the pivoted frame for closing the compartment entrance when said frame is rocked on its pivotal center.

LARKIN R. SHAFFER.